United States Patent [19]
Zhou et al.

[11] Patent Number: 5,943,351
[45] Date of Patent: Aug. 24, 1999

[54] INTRA-CAVITY AND INTER-CAVITY HARMONICS GENERATION IN HIGH-POWER LASERS

[75] Inventors: Fuzheng Zhou, Hicksville; Qiang Fu, Nesconset; Michael Maikowski, Commack, all of N.Y.

[73] Assignee: Excel/Quantronix, Inc., Hauppauge, N.Y.

[21] Appl. No.: 09/017,342

[22] Filed: Feb. 2, 1998

Related U.S. Application Data

[60] Provisional application No. 60/046,751, May 16, 1997.

[51] Int. Cl.$^6$ ........................................................ H01S 3/10
[52] U.S. Cl. .................................... 372/22; 372/92
[58] Field of Search .................................. 372/21, 22, 92

[56] References Cited

U.S. PATENT DOCUMENTS

| | | |
|---|---|---|
| 4,618,957 | 10/1986 | Liu . |
| 5,025,446 | 6/1991 | Kuizenga . |
| 5,027,361 | 6/1991 | Kozlovsky et al. . |
| 5,144,630 | 9/1992 | Lin . |
| 5,278,852 | 1/1994 | Wu et al. . |

OTHER PUBLICATIONS

A.J. Alfrey, "Intracavity Tripling of Diode–Pumped Nd:YV04 at High Q–Switch Repetition Rates", Conference on Lasers and Electro–Optics (CLEO) 1996, pp. CPD19–1 to CPD19–5.

"Third–Harmonic Generation in Nd:YLF", Lasers & Optronics (R. Cunningham, Ed.) (undated), p. 74.

Pixton; Tripling YAG frequency; Laser Focus;pp. 66–70 Jul. 1978.

Primary Examiner—Leon Scott, Jr.
Attorney, Agent, or Firm—Darby & Darby

[57] ABSTRACT

Intra-cavity and/or inter-cavity sub-resonators with dielectric coated mirrors have anti-reflection and high-reflection coatings to attain high efficiency third and higher order harmonics generation of laser radiation. Main-resonators and sub-resonators enhance the fundamental and harmonic oscillations, respectively, which result in high conversion efficiency of third harmonics and higher. Such improved lasing efficiency may be implemented in high power lasers for improved power performance to attain over 8 W of UV output power with a high repetition rate. The use of intra-cavity THG techniques provide high efficiency by using existing high intensities of the input fundamental frequencies available in the intra-cavity region of the laser to avoid damage to components of the laser, such as the laser crystal. The THG utilizes a double-pass and/or multi-pass arrangement, which results in about a 60% increase in output power compared to a single-pass configuration. Also, blocking of UV energy generated in a return pass is performed to eliminate damage by the UV to the components in the main cavity.

23 Claims, 8 Drawing Sheets

INTRA-CAVITY AND INTER-CAVITY HARMONICS GENERATION IN HIGH-POWER LASERS

CROSS-REFERENCE TO RELATED APPLICATIONS

This patent application claims the benefit of U.S. Provisional Patent Application No. 60/046,751, filed May 16, 1997, now abandoned, and which is incorporated herein by reference.

BACKGROUND OF THE INVENTION

1. Field of the Invention

This disclosure relates generally to the field of laser resonators and harmonic frequency generation, and in particular to intra-cavity and inter-cavity resonators for high efficiency harmonic generation.

2. Description of Related Art

Lasers have found broad application in many fields, such as medical procedures, scientific experiments, and industrial applications including marking objects, drilling, etc. The industrial demand for laser-machining of various materials in micrometer size has stimulated the research and development of ultraviolet (UV) beam generation, especially compact laser systems for generating high power UV laser beams.

Many of such UV lasers generate the UV output using an extra-cavity configuration; that is, a laser beam is generated in a cavity and the output of the cavity is directed to a crystal external to the cavity, such that the external crystal generates the UV output. Some lasers, however, generate a UV output using an intra-cavity configuration; that is, the laser beam and harmonics thereof are generated using mirrors and non-linear crystals internal to a cavity, which generates the UV output.

Some compact and commercially-oriented intra-cavity solid-state lasers have attained relatively high average UV output powers; for example, as discussed in A. J. Alfrey, "Intracavity Tripling of Diode-Pumped Nd:YVO4 at High Q-Switch Repetition Rates", CONFERENCE ON LASERS AND ELECTRO-OPTICS, pp. CPD19-1to CPD19-5 (1996). The Alfrey publication discloses a laser system which generates 355 nm laser radiation with an average UV output power of 2 W at 30 kHz. In addition, a solid-state laser system available from Lambda Physik is reported to be able to generate 4 W of average UV output power at 1 kHz.

For industrial applications, a need exists for compact solid-state laser systems providing even greater UV output power with a high enough repetition rate during operation to achieve high throughput in industrial processing.

Electromagnetic sum-frequency generation and difference-frequency generation in lasers has been known for over three decades for generating higher order harmonics. Hereinafter, $NT^{TH}$ order harmonic generation (HG) may be labelled NHG, in which $N \geq 1$. For example, fundamental frequency generation may be labeled 1HG, second harmonic generation may be labelled 2HG, third harmonic generation may be labelled 3HG, etc.

Improvements in the power and efficiency of lasers have been achieved using non-linear media, such as lithium triborate (LBO) crystals, which perform sum-frequency processes. The non-linear nature of such non-linear media cause the conversion efficiency to increase as the intensity of the input frequencies increases.

One technique known in the art to increase the conversion efficiency is to implement the laser resonator in an intra-cavity configuration; for example, to place a non-linear crystal inside the laser resonator such that the laser intensity received by the crystal inside the laser is about one or two orders of magnitude higher than the output intensity of the laser. Such intra-cavity techniques may be used for second harmonic generation (labelled SHG or 2HG), as is known in the art, in which the second harmonics are obtained by generating the sum of fundamental frequencies.

Another sum-frequency generation technique is third harmonic generation (labelled THG or 3HG), which is one of the most efficient methods for generating UV wavelengths from solid-state lasers with a low $M^2$ for the laser beam quality. Due to the non-linear nature of the elements employed, the conversion efficiency of THG techniques is generally proportional to the intensity of each of the two input frequencies; that is, the fundamental and the second harmonics. Traditional THG techniques in use have been implemented generally external to the laser cavity; that is, have been extra-cavity configurations, and have not utilized the existing higher intra-cavity intensities.

A typical and common problem of high intensity laser applications is damage to the crystal, such as a non-linear crystal, when focussing sharply on the crystal in order to achieve a desired conversion efficiency. Accordingly, a need exists for higher order harmonic generation which avoids such damage to the crystal and other laser components.

Some prior art lasers utilize the intra-cavity frequencies. Diode-pumped UV laser configurations using prisms are typical examples of intra-cavity SHG systems implementing THG in a one-pass configuration. For example, the A. J. Alfrey publication, described above, discloses such a system for generating 355 nm laser radiation with over 2 W average power, which creates subsequent THG in a two-pass configuration. However, the creation of THG from SHG in one-pass configurations in the prior art have generally resulted in relatively low efficiency.

Other intra-cavity techniques may be used, such as techniques described in U.S. Pat. No. 5,278,852 to Wu et al., in which SHG is performed in a sub-cavity, and THG is performed in a single-pass manner to operate as a low peak power laser. Such single-pass THG generally has less conversion efficiency than THG using a double-pass configuration. In addition, in implementing THG, intra-cavity techniques in the prior art may result in propagation of the UV beams back toward the lasing crystal, which may cause damage to other optical components in the main cavity. U.S. Pat. No. 5,025,446 to Kuizenga describes a high power laser system having an intra-cavity configuration, as well as back-propagation of the UV beams.

Accordingly, a need exists for higher order harmonic generation with improved conversion efficiency while avoiding back-propagation damage to the crystal and other laser components.

In addition, many lasers in the prior art are arranged in angular configurations, using sections configured, for example, at right angles to each other, and using mirrors and prisms for angularly directing the laser beams. The components positioned in such configurations are generally difficult to align, while linear configurations are relatively easier to align.

Accordingly, a need exists for a high power UV laser system having a linear configuration.

SUMMARY OF THE INVENTION

It is recognized herein that high efficiency third and higher order harmonics generation of laser radiation may be attained by using intra-cavity and/or inter-cavity sub-resonators with dielectric coated mirrors having anti-reflection and high-reflection coatings. Main-resonators and sub-resonators enhance the fundamental and harmonic oscillations, respectively, which result in high conversion efficiency of third harmonics and higher. Such improved lasing efficiency may be implemented in high power lasers for improved power performance to attain over 8 W of UV output power with a high repetition rate.

In addition, the use of intra-cavity THG techniques provides high efficiency by using the existing high intensities of the input fundamental frequencies available in the intra-cavity region of the laser, to therefore avoid damage to components of the laser, such as the laser crystal.

SHG is then established in a sub-cavity, which results in high efficiency, such as about 20% or higher, while intra-cavity THG is established using the high intensity of the fundamental frequency and the SHG frequency to attain high efficiencies of about 30% or higher. The THG utilizes a double-pass and/or multi-pass arrangement, which results in about a 60% increase in output power compared to a single-pass configuration. Any UV generated in a return pass is blocked to eliminate damage to the components in the main cavity by the UV. Such SHG and THG may also be implemented using elements arranged in a straight-line (linear) configuration.

BRIEF DESCRIPTION OF THE DRAWINGS

The features of the disclosed laser generation system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
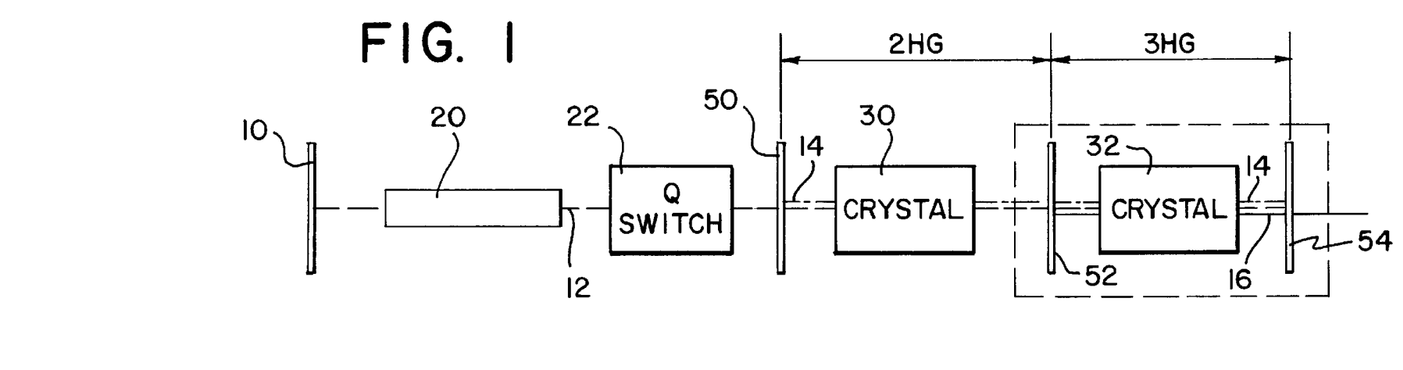
FIG. 1 illustrates the disclosed laser generation system having an intra-cavity linear configuration.
Figure 2:
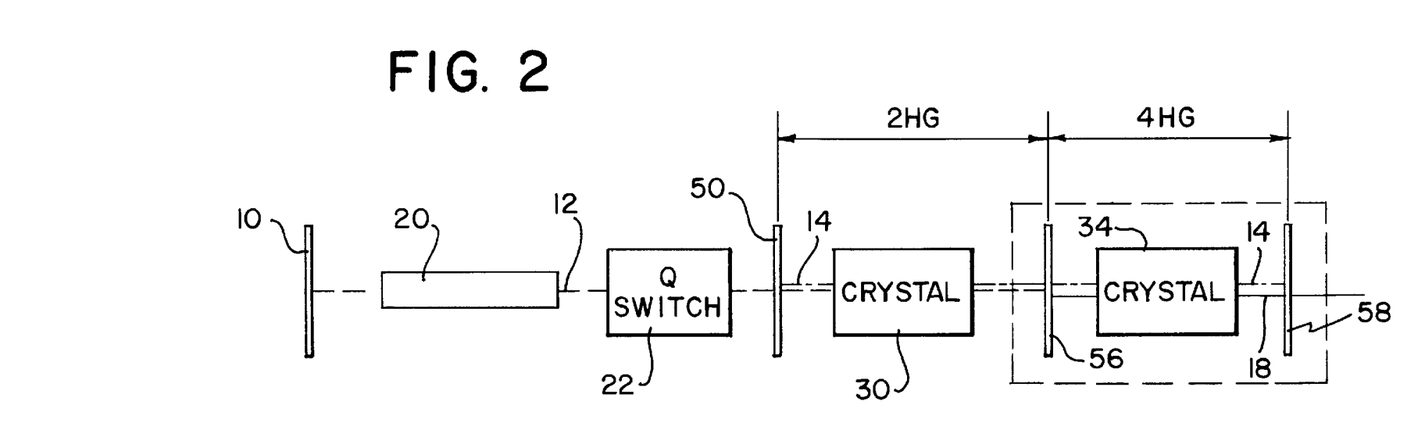
FIG. 2 illustrates the disclosed laser generation system having an inter-cavity linear configuration.

Referring in specific detail to the drawings, with common reference numbers identifying similar or identical elements, steps, and features, as shown in FIGS. 1–2, the present disclosure describes a laser generation system and method for generating high UV output power with a high repetition rate and with both high efficiency and compactness for use in, for example, industrial applications. FIG. 1 illustrates an intra-cavity configuration, and FIG. 2 illustrates an inter-cavity configuration, as described herein.

Referring to FIG. 1, the disclosed laser generation system and method operates as a continuous wave (CW) pumped laser, or alternatively a pulsed pumped laser, having a linear configuration. The laser includes a cavity having a first mirror 10, a lasing rod 20, an acousto-optic Q-switch 22, a second mirror 50, a SHG crystal 30, a third mirror 52, a THG crystal 32, and a fourth mirror 54. Other elements known in the art, such as the CW emitter and the structural frame for holding the components, are included in the laser but are not shown in FIG. 1 for clarity of illustration. For example, the CW emitter may be a CW Kr arc-lamp or at least one laser diode for electromagnetically pumping the lasing rod 20.

In the preferred embodiment, the laser rod 20 may be a 145 mm Nd:YAG rod as a laser active medium. Alternatively, the lasing rod 20 may be composed of Nd:YLF, Nd:YVO$_4$, Yb:YAG, or other laser active media known in the art.

In the preferred embodiment, the SHG crystal 30 may be a LBO crystal for type-I SHG. Alternatively, the SHG crystal 30 may be composed of known SHG crystals such as potassium titanyl phosphate (KTP), barium metaborate (BBO), LiIO$_3$, LiNbO$_3$, or other SHG devices or elements known in the art for either type-I phase-matching or type-II phase-matching. In addition, the SHG crystal 30 has anti-reflection (AR) characteristics at 1064 nm and at 532 nm.

In the preferred embodiment, the THG crystal 32 may be a LBO crystal for type-II THG. Alternatively, the THG crystal 32 may be composed of known THG crystals such as KTP, KDP, ADP, BBO, CLBO, LiIO$_3$, LiNbO$_3$, or other THG devices or elements known in the art for either type-I phase-matching or type-II phase-matching. In addition, the THG crystal 32 has AR characteristics at 1064 nm, at 532 nm, and at 355 nm.

In the preferred embodiment, the first mirror 10 is coated for high reflection (HR), such as over 90% reflection, at 1064 nm; the second mirror 50 is coated for AR at 1064 nm and HR at 532 nm; the third mirror 52 is coated for AR at 1064 nm, AR at 532 nm, and HR at 355 nm; and the fourth mirror 54 is coated for HR at 1064 nm, HR at 532 nm, and high transmission (HT) (or, alternatively, AR), such as over about 90% transmission, at 355 nm.

The mirrors 10 and 50–54 and/or the coating thereof with such high degrees of reflection and transmission are commercially available from the Shanghai Institute of Optics and Fine Mechanics, Academia Sinica, Shanghai, China.

Figure 3:
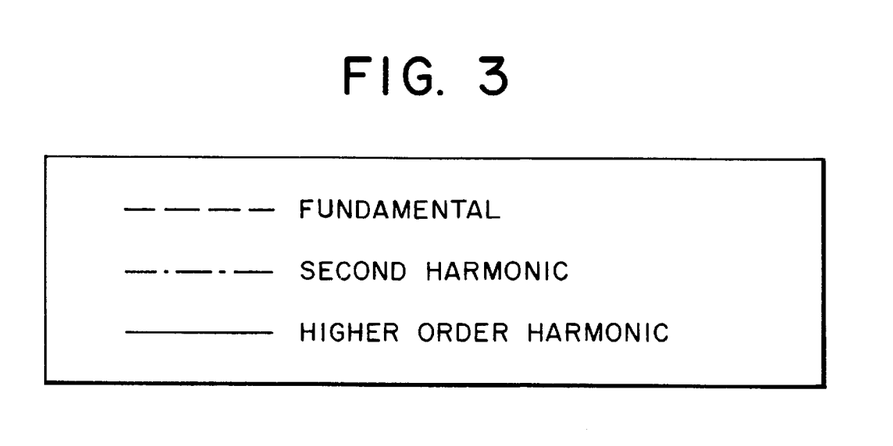
FIG. 3 is a legend indicating harmonics as shown in the drawings.

The main cavity of the disclosed laser generation system having the intra-cavity configuration is formed by the mirrors 10 and 54, which cause oscillation of the fundamental 12 at 1064 nm using the Nd:YAG rod 20. The harmonics are illustrated in FIG. 1 in conjunction with the legend shown in FIG. 3, in which the fundamental 12 is shown as a first dashed line, the second harmonic 14 is shown as a second dashed line, and higher order harmonics with N≧3 are shown as solid lines, such as the solid line 16 in FIG. 1, in which N is the order of the harmonic.

The mirrors 50 and 54 form a first sub-cavity for the intra-cavity SHG to create the second harmonic 14 therein, and the mirrors 52 and 54 form a second sub-cavity for the double-pass and/or multi--pass intra-cavity THG 32, such that the fundamental 12 and the second harmonic 14 generate at least a third harmonic, shown as the solid line 16. In addition, the use of a double-pass and/or multi-pass intra-cavity THG 32 provides greater efficiency.

The use of the third mirror 52, which is a dichroic mirror for harmonic separation and being HR at 355 nm, also prevents UV radiation, for example, UV at 355 nm, generated by the THG crystal 32 from reflecting back toward the main cavity, including the rod 20, as well as toward the SHG crystal 30, thus preventing damage to the optical components due to the high intensity UV.

Figure 4:
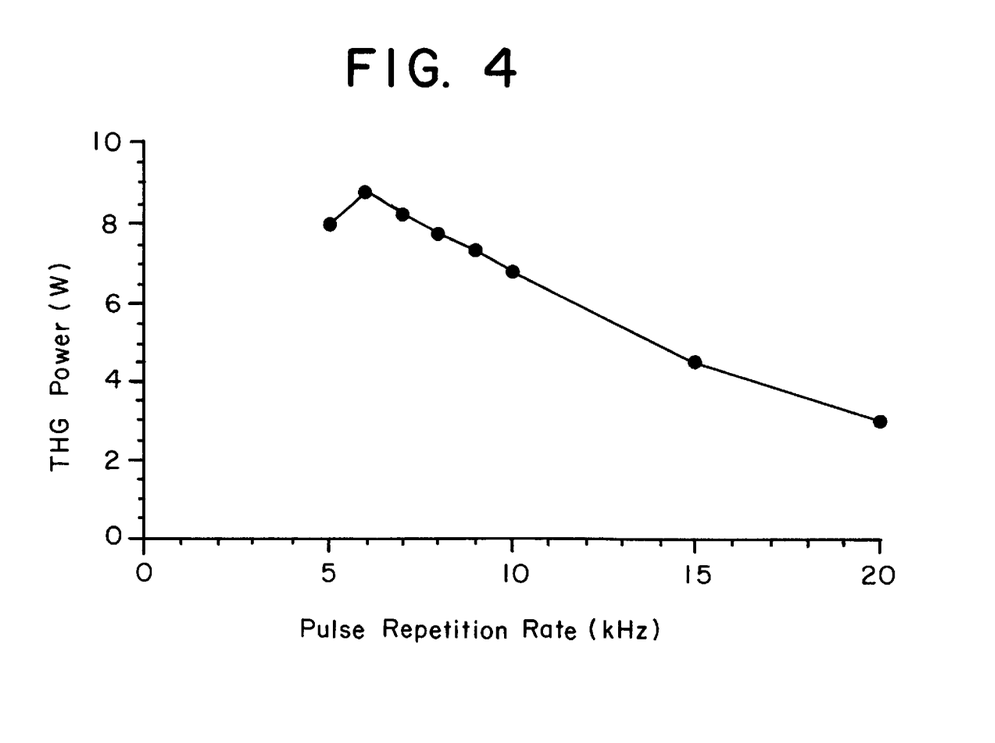
FIG. 4 is a graph illustrating the THG power over a range of pulse repetition rates.

In operation, the disclosed laser generation system provides high UV output depending upon the pulse repetition rate, since the THG crystal 32 performs THG as a function of the pulse repetition rate. As shown in FIG. 4, when the repetition rate of the laser is continuously varied from 5 kHz to 20 kHz, the output of the THG crystal 32 is about 8 W at about 5 kHz and is about 3 W at about 20 kHz. One example of a maximum power achievable by the disclosed laser generation system is about 8.8 W at a pulse repetition rate of about 6 kHz. Such high UV output power at such pulse repetition rates is advantageous for many diverse applications, such as medical procedures, scientific experiments, and industrial applications.

The non-linear conversion efficiency between the SHG crystal 30 and the THG crystal 32 in the disclosed laser generation system may be estimated at a moderate repetition rate of about 10 kHz. At such a repetition rate, the disclosed laser generation system generates about 20 W for SHG and about 6.8 W for THG from the Nd:YAG oscillator 20. Such power values correspond to an effective SHG-to-THG conversion efficiency of about 34%, which is a relatively high efficiency for laser applications.

By employing intra-cavity SHG in a multi-pass fashion, the interaction length of the non-linear crystal is effectively increased and high conversion efficiency is obtained.

In an alternative embodiment, the rod 20 in FIG. 1 may be a lamp-pumped Nd:YLF crystal, with subsequent sub-cavities for SHG and THG, as well as higher order harmonics, as described herein. Using a Nd:YLF crystal, the disclosed laser generation system attains about 11.5 W of UV power at about 351 nm when pulsed at a repetition rate of about 2 kHz. Accordingly, such SHG and THG provides relatively high UV power for a variety of lamp-pumped crystals.

The cavity design is relatively simple and compact, allowing the overall length of the laser head to be about 74 cm.

In an alternative embodiment, the disclosed laser generation system in FIG. 1 may be adapted for performing fourth harmonic generation (4HG), in which the crystal 32 and mirrors 52–54 are adapted for 4HG. For example, the third mirror 52 is coated to be HR at 1064 nm, AR at 532 nm, and HR at 266 nm, and the fourth mirror 54 is coated to be HR at 532 nm and AR at 266 nm. In the alternative embodiment, the 4HG crystal 32 is an LBO crystal which is AR at 532 nm and AR at 266 nm. It is understood that other types of crystals may be used, as described herein and as known in the art.

The sub-cavity formed between the mirrors 52, 54 performs as a double-pass intra-cavity 4HG for generating a fourth harmonic from the second harmonic 14. As per FIG. 3, the second harmonic is depicted as a dashed line, while the fourth harmonic is a higher order harmonic depicted as the solid line 16.

In an alternative embodiment shown in FIG. 2, the disclosed laser generation system has an inter-cavity configuration; that is, the sub-cavity generating the higher harmonics is external to the main cavity, but the sub-cavity is electromagnetically coupled to the main cavity.

As shown in FIG. 2, the disclosed laser generation system in the inter-cavity configuration has a first mirror 10, a rod 20, a Q-switch 22, a second mirror 50, and a SHG crystal 30, as described above for FIG. 1. A third mirror 56 is included such that the main cavity of FIG. 2 is formed between the mirrors 10 and 56.

In the alternative embodiment shown in FIG. 2, harmonics of higher orders than two may be generated. For example, for 4HG, a 4HG crystal 34 is disposed between a fourth mirror 57 and a fifth mirror 58 to form a sub-cavity external to the main cavity. In the alternative embodiment, the third mirror 56 is coated to be HR at 1064 nm, AR at 532 nm, and AR at 355 nm; the fourth mirror 57 is coated to be AR at 532 nm and HR at 355 nm; and the fifth mirror 58 is coated to be HR at 532 nm and AR at 266 nm. In the alternative embodiment, the 4HG crystal 34 is an LBO which is AR at 532 nm and AR at 266 nm. It is understood that other types of crystals may be used, as described herein and as known in the art.

The main cavity, including the mirrors 10 and 56, generates oscillations of the fundamental at 1064 nm using, for example, an Nd:YAG rod 20, but the third mirror 56 limits the fundamental to oscillate within the main cavity and the sub-cavity having the SHG crystal 30. Another sub-cavity is formed between the mirrors 50, 58 for inter-cavity SHG, while the sub-cavity formed between the mirrors 56, 58 performs as a double-pass inter-cavity 4HG for generating a fourth harmonic 18 from the second harmonic 14. As per FIG. 3, the second harmonic 14 is depicted as a dashed line, while the fourth harmonic 18 is a higher order harmonic depicted as a solid line.

Using the inter-cavity configuration of FIG. 2, the disclosed laser generation system generates the fourth harmonic 18 outside of the main cavity, which reduces any loss of power due to individual losses from each component. In addition, as described above for FIG. 1, the coating of the third mirror 56 prevents transmission of high intensity UV back toward the rod 20 and other components to avoid damage thereto.

Figure 5:
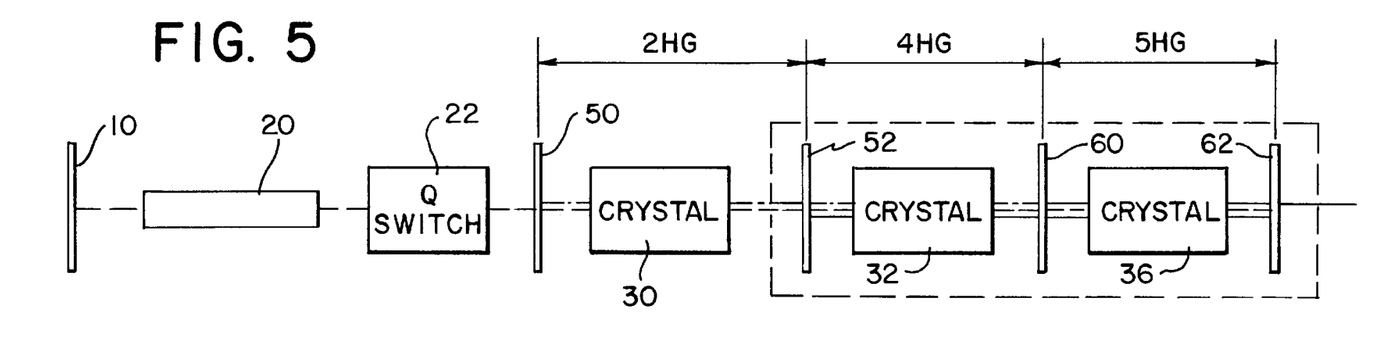
FIGS. 5–11 illustrate alternative embodiments for generating higher order harmonics.

As shown in FIGS. 5–11, it is possible to have other alternative embodiments utilizing coated mirrors as described above for generating higher order harmonics, according to the present invention. In FIG. 5, appropriately coated mirrors and crystals are adapted to form sub-cavities for 2HG, 4HG, and 5HG for intra-cavity harmonics generation. For example, the mirror 50 is coated to be AR for 1064 nm and HR for 532 nm; the mirror 52 is coated to be AR for 1064 nm, HR for 532 nm, and AR for 355 nm; the mirror 60 is coated to be AR for 1064 nm, HR for 532 nm, AR for 355 nm, and AR for 266 nm; and the mirror 62 is coated to be HR for 1064 nm, HR for 532 nm, and AR for 213 nm.

Also, the 2HG crystal 30 may be composed of LBO and is AR for 1064 nm and AR for 532 nm; the 4HG crystal 32 may be composed of LBO and is AR for 1064 nm, AR for 532 nm, and AR for 355 nm; and the 4HG crystal 32 may be composed of LBO and is AR for 1064 nm, HR for 266 nm, and AR for 213 nm.

Accordingly, mirrors 50 and 60 form a sub-cavity for intra-cavity 2HG, mirrors 52 and 62 form a sub-cavity for intra-cavity 4HG, and mirrors 60–62 form a sub-cavity for double-pass intra-cavity 5HG.

Figure 6:
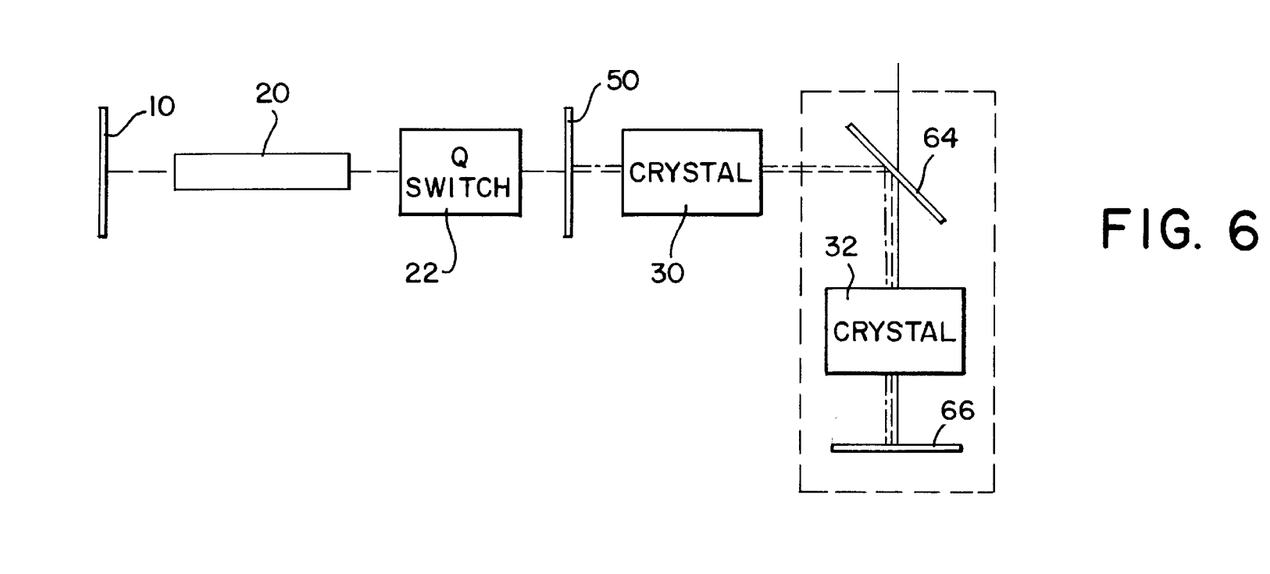

As shown in FIG. 6, in another alternative embodiment of FIG. 1, the mirror 50 is coated for AR at 1064 nm and HR for 532 nm; the mirror 64 is coated for HR at 1064 nm, HR at 532 nm, and AR at 355 nm; and the mirror 66 is coated for HR at 1064 nm, HR at 532 nm, and HR at 355 nm. The crystal 30 is AR at 1064 nm and AR at 532 nm; and the crystal 32 is AR at 1064 nm, HR at 532 nm, and HR at 355 nm. The mirrors 50 and 66 form a sub-cavity for intra-cavity 2HG, and the mirrors 64-64 form a sub-cavity for double-pass intra-cavity 3HG. In this arrangement, the sub-cavity between the mirrors 64–66 has a longitudinal axis which is at an angle of about 90° to a longitudinal axis of the main cavity.

Figure 7:
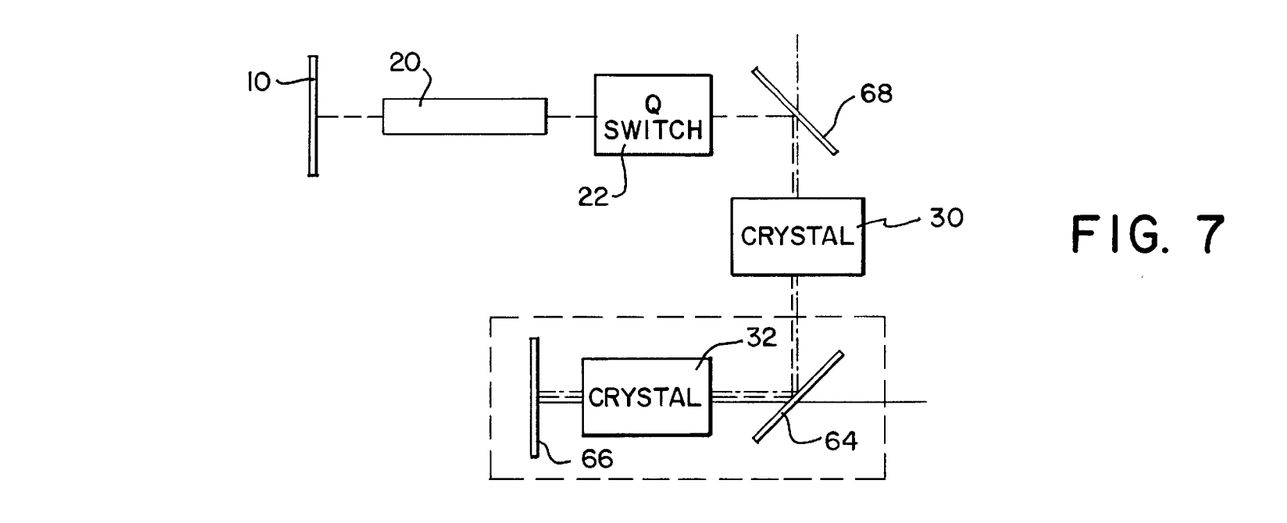

As shown in FIG. 7, in another alternative embodiment of FIG. 1, the mirror 68 is coated for AR at 1064 nm and HR for 532 nm; the mirror 64 is coated for HR at 1064 nm, HR at 532 nm, and AR at 355 nm; and the mirror 66 is coated for HR at 1064 nm, HR at 532 nm, and HR at 355 nm. The crystal 30 is AR at 1064 nm and AR at 532 nm; and the crystal 32 is AR at 1064 nm, HR at 532 nm, and HR at 355 nm. The mirrors 66–68 form a sub-cavity for intra-cavity 2HG, and the mirrors 64–66 form a sub-cavity for double-pass intra-cavity 3HG. The path from the mirror 68 to mirror 64 is at an angle of about 90° to a longitudinal axis of the main cavity. The sub-cavity of the mirrors 64–66 has a longitudinal axis which is at an angle of about 90° to the longitudinal axis of the path from the mirror 68 to mirror 64, so that the laser beams are directed in the sub-cavity between mirrors 64–66 to be parallel to beams in the main cavity.

Figure 8:
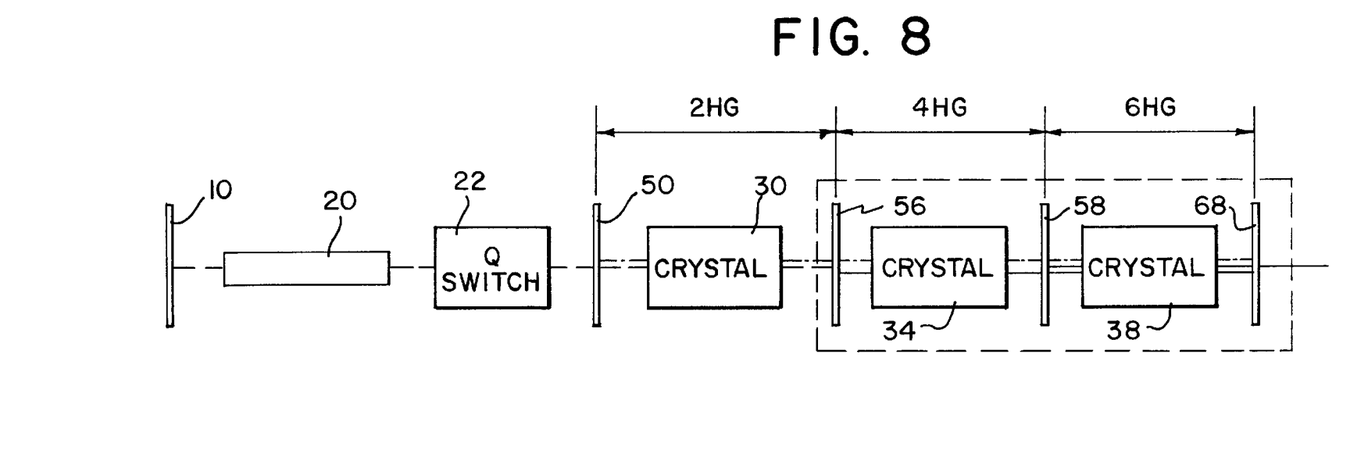

In an alternative embodiment shown in FIG. 8, appropriately coated mirrors and crystals are adapted to form sub-cavities for 2HG, 4HG and 6HG for intra-cavity harmonics generation, using mirrors 50, 56, 58, and 68 for forming sub-cavities which include crystals 30, 34, and 38, respectively, for 2HG, 4HG, and 6HG, respectively. The coating of the mirrors and the characteristics of the mirrors and the crystals to be AR and HR for specific frequencies may be as described above for FIGS. 1–2 and 5–7. One having ordinary skill in the art may adapt such AR and HR characteristics to generate 2HG, 4HG, and 6HG, respectively.

Figure 9:
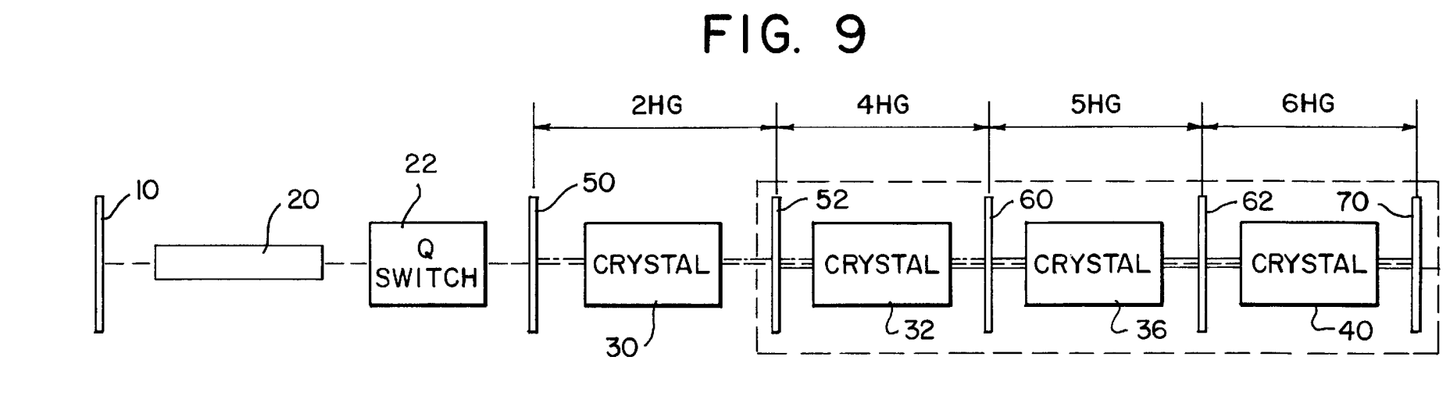

In another alternative embodiment shown in FIG. 9, appropriately coated mirrors crystals are adapted to form sub-cavities for 2HG, 4HG, 5HG, and 6HG for intra-cavity harmonics generation, using mirrors 50, 52, 60, 62, and 70 for forming sub-cavities which include crystals 30, 32, 36, and 40, respectively, for 2HG, 4HG, 5HG, and 6HG, respectively. The coating of the mirrors and the characteristics of the mirrors and the crystals to be AR and HR for specific frequencies may be as described above for FIGS. 1–2 and 5–7. One having ordinary skill in the art may adapt such AR and HR characteristics to generate 2HG, 4HG, and 6HG, respectively.

Figure 10:
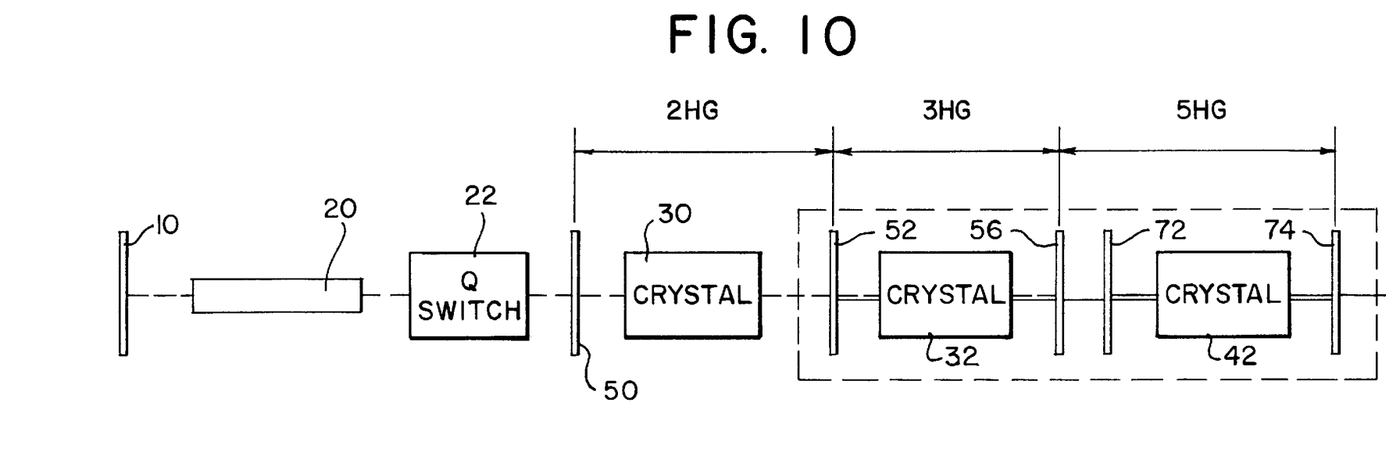

In FIG. 10, appropriately coated mirrors and crystals are adapted to form sub-cavities for 2HG, 3HG, and 5HG for intra-cavity harmonics generation. For example, the mirror 50 is coated to be AR for 1064 nm and HR for 532 nm; the mirror 52 is coated to be AR for 1064 nm, AR for 532 nm, and HR for 355 nm; the mirror 56 is coated to be HR for 1064 nm, AR for 532 nm, and AR for 355 nm; the mirror 72 is coated to be AR for 532 nm, AR for 355 nm, and HR for 213 nm; and the mirror 74 is coated to be HR for 532 nm, HR for 355 nm, and AR for 213 nm.

Also, the 2HG crystal 30 may be composed of LBO and is AR for 1064 nm and AR for 532 nm; the 3HG crystal 32 may be composed of LBO and is AR for 1064 nm, AR for 532 nm, and AR for 355 nm; and the 5HG crystal 42 may be composed of LBO and is AR for 532 nm, AR for 355 nm, and AR for 213 nm.

Accordingly, the mirrors 10 and 56 form the main cavity for oscillating the fundamental at 1064 nm using a Nd:YAG rod for rod 20. The mirrors 50 and 74 form a sub-cavity for intra-cavity 2HG, mirrors 52 and 74 form a sub-cavity for double-pass intra-cavity 3HG, and mirrors 72–74 form a sub-cavity for double-pass intra-cavity 5HG.

Figure 11:
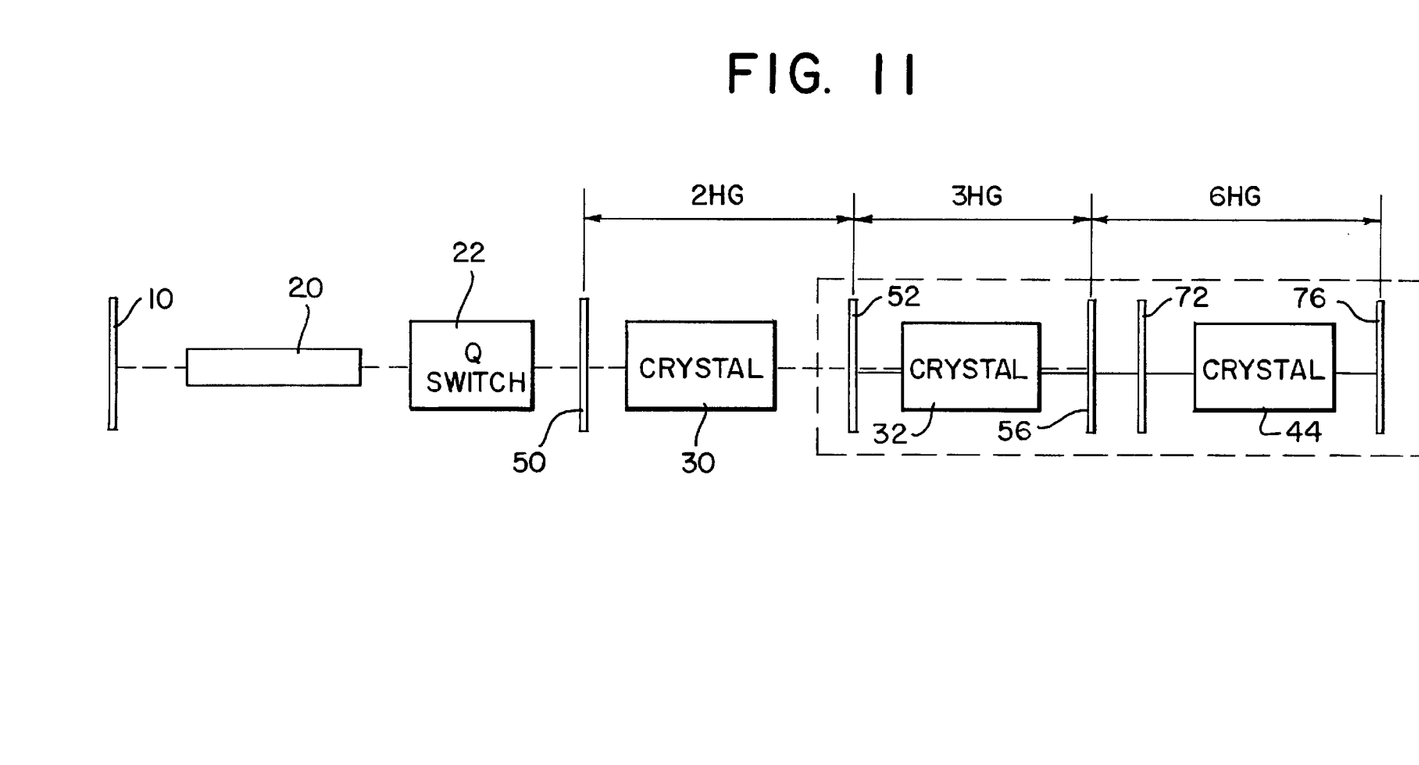

In FIG. 11, appropriately coated mirrors and crystals are adapted to form sub-cavities for 2HG, 3HG, and 6HG for intra-cavity harmonics generation. For example, the mirror 50 is coated to be AR for 1064 nm and HR for 532 nm; the mirror 52 is coated to be AR for 1064 nm, AR for 532 nm, and HR for 355 nm; the mirror 56 is coated to be HR for 1064 nm, HR for 532 nm, and AR for 355 nm; the mirror 72 is coated to be AR for 355 nm and for 177 nm; and the mirror 76 is coated to be HR for 355 nm and AR for 177 nm.

Also, the 2HG crystal 30 may be composed of LBO and is AR for 1064 nm and AR for 532 nm; the 3HG crystal 32 may be composed of LBO and is AR for 1064 nm, AR for 532 nm, and AR for 355 nm; and the 6HG crystal 44 may be composed of LBO and is AR for 355 nm and AR for 177 nm.

Accordingly, the mirrors 10 and 56 form the main cavity for oscillating the fundamental at 1064 nm using a Nd:YAG rod for rod 20. The mirrors 50 and 74 form a sub-cavity for intra-cavity 2HG, mirrors 52 and 76 form a sub-cavity for double-pass intra-cavity 3HG, and mirrors 72 and 76 form a sub-cavity for double-pass intra-cavity 6HG.

It is understood that such alternative embodiments in FIGS. 5–11 may be adapted to be inter-cavity configurations for improved performance, as described above.

Improved performance may be gained, for example, using an implementation of the apparatus in FIG. 1 to attain a very high UV output of over about 11 W of Transverse Electromagnetic mode (TEM00 mode) and about 23 W of multi-mode average output power, at wavelengths of about 351 nm using a Q-switched Nd:YLF laser with the intra-cavity UV generation described above.

In this embodiment, the laser is a linear laser resonator having a cavity length of about 95 cm. The laser uses a lasing rod 20 composed of Nd:YLF which is about 4 mm. in diameter and about 145 mm. long. The Q-switch 22 is an acousto-optic Q-switch. The crystal 30 is an LBO crystal for second harmonic generation, and the crystal 32 is an LBO crystal for third harmonic generation. A spatial mode selector (not shown in FIG. 1) may be used to select either TEM00 mode or multi-mode output by varying the size of an aperture of the spatial mode selector.

Figure 12:
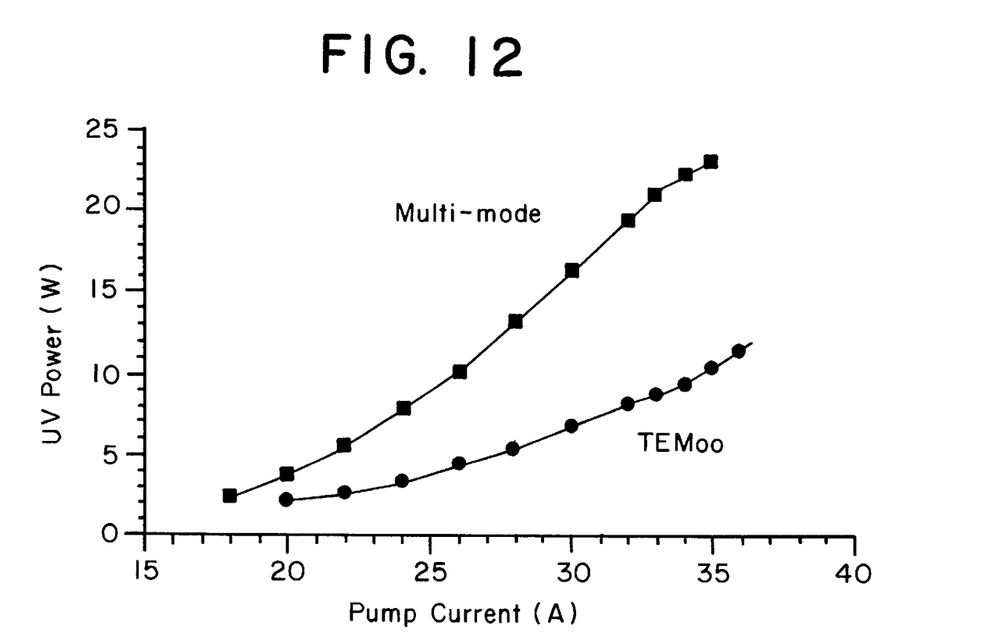
FIG. 12 illustrates the UV output power of the laser of FIG. 1 for attaining output power greater than about 11 W.

FIG. 12 illustrates the UV output power of the laser at a Q-switch repetition rate of 2.5, with the UV output power being measured against the pump current. Without spatial mode variation, the UV output tracks linearly with the lamp current. No significant saturation is observed up to a lamp current of about 35 A, when the UV output at 351 nm. is about 11.5 W for the TEM00 mode, and is about 23.2 W for the multi-mode.

Figure 13:
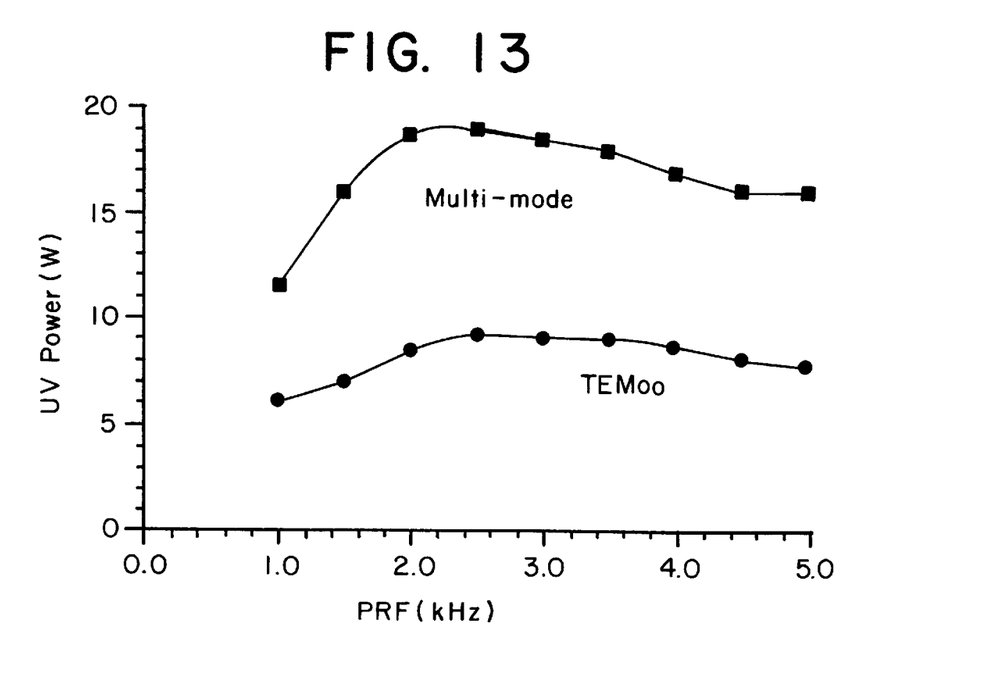
FIG. 13 illustrates the UV output power measured as a function of the Q-switch repetition rate.

FIG. 13 illustrates the UV output power measured as a function of the Q-switch repetition rate at a lamp current of about 32 A. The output power increases with a repetition rate up to about 2 kHz, and the output power remains substantially constant in the pulse repetition frequency (PRF) range of about 2 kHz to about 5 kHz for both TEM00 mode and multi-mode operation. Such an increase of power at relatively low repetition rates may be attributed to the energy storage time of the Nd:YLF rod 20. As the repetition rate increases to higher than 2 kHz, the high non-linear conversion efficiency leads to the saturation behavior of the UV output. A relatively small decrease in power may be observed due to longer pulse widths, since the pump energy; that is, the lamp current, is held substantially constant.

Figure 14A:
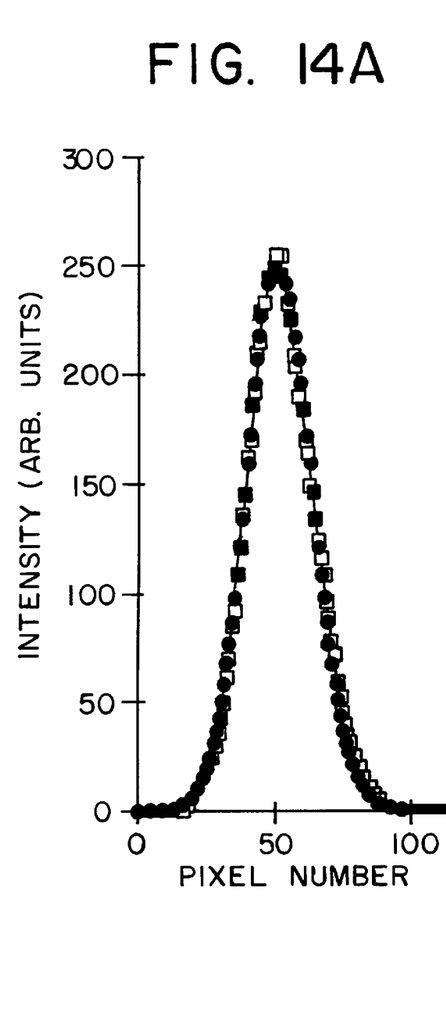
FIG. 14 illustrates the spatial profile of the TEM00 mode output.
Figure 14B:
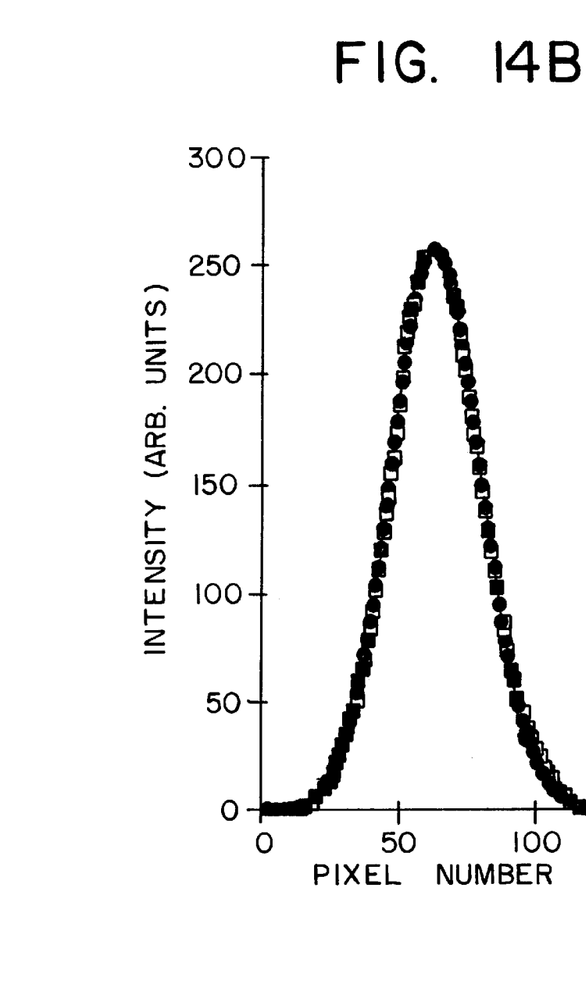

FIG. 14 illustrates the spatial profile of the TEM00 mode output at about 11.5 W with Gaussian fits for both the x-y dimensions, with a substantial match between the measured data and the Gaussian fits. In FIG. 14, the intensity of the TEM00 mode output is measured in arbitrary units against a pixel number parameter. The spatial mode profiles in both the horizontal and vertical directions for the TEM00 mode are plotted using open squares, and the spatial mode profiles in both the horizontal and vertical directions for the Gaussian fits are plotted using solid dots. As shown in FIG. 14, good agreement is obtained between the TEM00 mode data and the Gaussian fit data.

For the TEM00 mode output, the measured $M^2$ value is about 1.6, and the pulse-to-pulse amplitude stability is measured to be less than about 2%, with a pulse width of about 80 ns. at about 35 A.

While the disclosed laser generation system and method is particularly shown and described herein with reference to the preferred embodiments, it is to be understood that various modifications in form and detail may be made therein without departing from the scope and spirit of the present invention. Accordingly, modifications, such as any examples suggested herein, but not limited thereto, are to be considered within the scope of the present invention.

What is claimed is:

1. A laser comprising:
   a first mirror;
   a lasing element;
   a second mirror forming a main cavity with the first mirror and having the lasing element disposed in the main cavity to generate a first order harmonic laser signal;
   a first crystal;
   a third mirror forming a first cavity with the second mirror and having the first crystal disposed in the first cavity to generate a second order harmonic laser signal from the first fundamental laser signal;
   a second crystal; and
   a fourth mirror forming a second cavity with the second mirror and having the second crystal disposed in the second cavity to generate a higher order harmonic laser signal having a harmonic order greater than two.

2. The laser of claim 1, wherein the fourth mirror prevents ultra-violet radiation of the higher order harmonic laser signal from being transmitted toward the lasing element.

3. The laser of claim 1, wherein the higher order harmonic laser signal corresponds to a third order harmonic.

4. The laser of claim 3, wherein the second crystal generates the third order harmonic to output about 8.8 W of ultraviolet radiation at a repetition rate of about 6 kHz.

5. The laser of claim 1, wherein the higher order harmonic laser signal corresponds to a fourth order harmonic.

6. The laser of claim 1, wherein the first mirror and the lasing element are aligned along a first longitudinal axis; and
   wherein the second crystal and the fourth mirror are aligned along a second longitudinal axis, with the second longitudinal axis oriented at an angle of at least about 90° to the first longitudinal axis.

7. The laser of claim 6, wherein the third mirror and the first crystal are aligned along the first longitudinal axis; and
   wherein the second longitudinal axis is oriented at an angle of about 90° to the first longitudinal axis.

8. The laser of claim 6, wherein the first order harmonic laser signal is transmitted in a first direction along the first longitudinal axis;
   wherein the first crystal is aligned along a third longitudinal axis oriented at an angle of about 90° to the first longitudinal axis; and
   wherein the second longitudinal axis is oriented at an angle of about 180° to the first longitudinal axis, with the higher order harmonic laser signal being transmitted in a third direction opposite to the first direction.

9. The laser of claim 1, wherein the lasing element is a lasing rod and is composed of Nd:YLF; and wherein the second crystal generates a third order harmonic as the higher harmonic to output over about 11 W of ultraviolet radiation at 351 nm.

10. The laser of claim 9, wherein the generated output power is about 11.5 W in TEM00 mode operation.

11. The laser of claim 9, wherein the generated output power is about 23 W in multi-mode operation.

12. A laser comprising:
    a first mirror;
    a lasing element;
    a second mirror forming a main cavity with the first mirror and having the lasing element disposed in the main cavity to generate a first order harmonic laser signal;
    a first crystal;
    a third mirror;
    a fourth mirror forming a first cavity with the third mirror and having the first crystal disposed in the first cavity to generate a second order harmonic laser signal from the first fundamental laser signal;
    a second crystal; and
    a fifth mirror forming a second cavity with the fourth mirror and having the second crystal disposed in the second cavity to generate a fourth order harmonic laser signal.

13. The laser of claim 12, wherein the second cavity is separate from the main cavity.

14. The laser of claim 13, wherein the second cavity is electromagnetically coupled to the main cavity in an intercavity configuration for generating the higher order harmonic laser signal.

15. A laser comprising:
    a first mirror;
    a lasing rod;
    a Q-switch;
    a second mirror forming a main cavity with the first mirror and having the lasing rod and the Q-switch disposed in the main cavity to generate a first order harmonic laser signal;
    a first crystal;
    a third mirror forming a first cavity with the second mirror and having the first crystal disposed in the first cavity to generate a second order harmonic laser signal from the first fundamental laser signal;
    a second crystal; and
    a fourth mirror forming a second cavity with the second mirror and having the second crystal disposed in the second cavity to generate a higher order harmonic laser signal of ultraviolet radiation having a harmonic order greater than two;
    wherein the fourth mirror prevents the ultra-violet radiation of the higher order harmonic laser signal from being transmitted toward the lasing rod.

16. The laser of claim 15, wherein the second cavity performs multi-pass generation of the higher order harmonic laser signal to generate about 8.8 W of ultraviolet radiation with a wavelength of about 355 nm at a repetition rate of about 6 kHz.

17. The laser of claim 16, wherein the laser rod is composed of Nd:YAG.

18. The laser of claim 15, wherein the first mirror is coated for high reflection at about 1064 nm, the third mirror is coated for anti-reflection at about 1064 nm and for high reflection at about 532 nm, the fourth mirror is coated for anti-reflection at about 1064 nm and at about 532 nm and for high reflection at about 355 nm, and the second mirror is coated for high reflection at about 1064 nm and about 532 nm and high transmission at about 355 nm.

19. The laser of claim 15, wherein the ratio of the power of the higher order harmonic laser signal to the power of the second order harmonic laser signal is about 34% as a harmonic conversion efficiency at a repetition rate of about 10 kHz.

20. The laser of claim 15, wherein the second cavity performs multi-pass generation of the higher order harmonic laser signal to generate about 11.5 W of ultraviolet radiation with a wavelength of about 351 nm at a repetition rate of about 2 kHz.

21. The laser of claim 20, wherein the laser rod is composed of Nd:YLF.

22. The laser of claim 15, wherein the main cavity and the first and second cavities have an intra-cavity configuration for generating the higher order harmonic laser signal from the first order harmonic laser signal and the second order harmonic laser signal.

23. A laser comprising:

a lasing element;

a plurality of mirrors forming a plurality of cavities therebetween, wherein one of the cavities is a main cavity with the lasing element disposed therein;

a plurality of crystals, each crystal being disposed within a respective cavity, for generating a harmonic laser signal of ultraviolet radiation having a harmonic order greater than or equal to two and an output power of at least about 8 W; and wherein at least one of the mirrors prevents the ultraviolet radiation of the harmonic laser signal from being transmitted toward the lasing element.

* * * * *